(12) United States Patent
Smith et al.

(10) Patent No.: US 8,385,655 B2
(45) Date of Patent: Feb. 26, 2013

(54) METHOD AND SYSTEM FOR GENERATING INTRINSIC IMAGES USING SINGLE REFLECTANCE TECHNIQUE

(75) Inventors: Casey Arthur Smith, Grand Junction, CO (US); Youngrock Yoon, Knoxville, TN (US)

(73) Assignee: Tandent Vision Science, Inc., San Francisco, CA (US)

( * ) Notice: Subject to any disclaimer, the term of this patent is extended or adjusted under 35 U.S.C. 154(b) by 524 days.

(21) Appl. No.: 12/653,857

(22) Filed: Dec. 18, 2009

(65) Prior Publication Data

US 2011/0150338 A1   Jun. 23, 2011

(51) Int. Cl.
 *G06K 9/46* (2006.01)
 *G06K 9/48* (2006.01)
 *G06K 9/62* (2006.01)

(52) U.S. Cl. .................. 382/190; 382/199; 382/155

(58) Field of Classification Search .................. 382/190, 382/199, 155
 See application file for complete search history.

(56) References Cited

U.S. PATENT DOCUMENTS

| | | | |
|---|---|---|---|
| 6,445,812 B1 * | 9/2002 | Lai et al. | 382/141 |
| 7,596,266 B2 | 9/2009 | Maxwell et al. | 382/167 |
| 7,751,639 B1 * | 7/2010 | Finlayson et al. | 382/254 |
| 2006/0177149 A1 * | 8/2006 | Friedhoff et al. | 382/274 |
| 2008/0089576 A1 | 4/2008 | Bushell et al. | 382/154 |
| 2009/0161950 A1 | 6/2009 | Dana et al. | 382/165 |
| 2009/0226049 A1 * | 9/2009 | Debevec et al. | 382/118 |
| 2009/0245680 A1 | 10/2009 | Maxwell et al. | 382/266 |
| 2010/0142818 A1 | 6/2010 | Stein et al. | 382/173 |
| 2010/0142825 A1 | 6/2010 | Maxwell et al. | 382/199 |
| 2010/0278448 A1 | 11/2010 | Friedhoff et al. | 182/284 |
| 2010/0303348 A1 | 12/2010 | Tolliver et al. | 382/164 |
| 2010/0329546 A1 | 12/2010 | Smith | 382/164 |

OTHER PUBLICATIONS

Qiang He and Chee-Hung Henry Chu "Intrinsic Images by Fisher Linear Discriminant" Advances in Visual Computing Lecture Notes in Computer Science, 2007, vol. 4842/2007, 349-256.*
H. G. Barrow and J. M. Tenenbaum. Recovering intrinsic scene characteristics from images. In A. R. Hanson and E. M. Riseman, editors, Computer Vision Systems, pp. 3-26, New York, 1978. Academic Press.
Y.-C. Chung, J.-M. Wang, R. R. Bailey, S.-W. Chen, S.-L.Chang, and S. Cherng. Physics-based extraction of intrinsic images from a single image. In ICPR, pp. 693-696, 2004.
B. V. Funt, M. S. Drew, and M. Brockington. Recovering shading from color images. In ECCV, pp. 124-132, May 1992.
A. Olmos and F. A. A. Kingdom. A biologically inspired algorithm for the recovery of shading and reflectance images. Perception, 33:1463-1473, 2004.
L. Shen, P. Tan, and S. Lin. Intrinsic image decomposition with non-local texture cues. In CVPR, 2008.
M. F. Tappen, E. H. Adelson, and W. T. Freeman. Estimating intrinsic component images using non-linear regression. In CVPR, 2006.

(Continued)

*Primary Examiner* — Bhavesh Mehta
*Assistant Examiner* — Utpal Shah
(74) *Attorney, Agent, or Firm* — Davidson, Davidson & Kappel, LLC; Felix L. D'Arienzo, Jr.

(57) ABSTRACT

In a first exemplary embodiment of the present invention, an automated, computerized method is provided for processing an image. According to a feature of the present invention, the method comprises the steps of providing an image file depicting an image, in a computer memory, identifying a dominant region of single reflectance in the image and segregating the image into intrinsic images as a function of the dominant region of single reflectance.

6 Claims, 8 Drawing Sheets

OTHER PUBLICATIONS

M. F. Tappen, W. T. Freeman, and E. H. Adelson. Recovering intrinsic images from a single image. In NIPS, pp. 1367-1374, 2003.

M. F. Tappen, W. T. Freeman, and E. H. Adelson. Recovering irtrinsic images from a single image. PAMI, 27(9):1459-1472, 2005.

Y. Weiss and W. T. Freeman. What makes a good model of natural images? In CVPR, 2007.

L. Xu, F. Qi, and R. Jiang. Shadow removal from a single image. In ISDA, vol. 2, 2006.

U.S. Appl. No. 12/653,857, filed Mar. 10, 2010.

U.S. Appl. No. 12/661,052, filed Mar. 10, 2010, Casey Arthur Smith.

U.S. Appl. No. 12/661,052, filed Mar. 10, 2010.

"Inpainting and the Fundamental Problem of Image Processing" by Jianhong (Jackie) Shen, SIAM News, vol. 36, No. 5, Jun. 2003.

* cited by examiner

FIG. 1

Pixel Array for Storing Image Data

| P(1, 1) | P(1, 2) | ••• |  | ••• P(1, M) |
|---------|---------|-----|--|-------------|
| P(2, 1) | P(2, 2) |     |  | ⋮           |
| P(3, 1) | P(3, 2) |     |  | ⋮           |
| ⋮       |         |     |  |             |
| ⋮       |         |     |  | ⋮           |
| P(N, 1) | •••     |     |  | ••• P(N, M) |

Image File ⌐18

Figure 4: Log Color Space Chromaticity Plane

FIG. 5

Examples of Identifying Token Regions in an Image

Original Image

FIG. 6a

Token Regions

FIG. 6b $$\begin{bmatrix} 1 & -1 & 0 \\ 1 & 0 & -1 \\ 0 & 1 & -1 \end{bmatrix} \begin{bmatrix} I_a \\ I_b \\ I_c \end{bmatrix} = \begin{bmatrix} i_a - i_b \\ i_a - i_c \\ i_b - i_c \end{bmatrix}$$

$$\begin{bmatrix} 1 & -1 & 0 \\ 1 & 0 & -1 \\ 0 & 1 & -1 \end{bmatrix} \begin{bmatrix} l_a \\ l_b \\ l_c \end{bmatrix} = \begin{bmatrix} i_a - i_b - d_{ab} \\ i_a - i_c - d_{ac} \\ i_b - i_c - d_{bc} \end{bmatrix}$$

Figure 8

METHOD AND SYSTEM FOR GENERATING INTRINSIC IMAGES USING SINGLE REFLECTANCE TECHNIQUE

BACKGROUND OF THE INVENTION

Many significant and commercially important uses of modern computer technology relate to images. These include image processing, image analysis and computer vision applications. In computer vision applications, such as, for example, object recognition and optical character recognition, it has been found that a separation of illumination and material aspects of an image can significantly improve the accuracy of computer performance.

SUMMARY OF THE INVENTION

The present invention provides a method and system implementing image processing techniques that utilize spatio-spectral information relevant to an image, to perform an operation to accurately and correctly identify and separate illumination and material aspects of the image.

In a first exemplary embodiment of the present invention, an automated, computerized method is provided for processing an image. According to a feature of the present invention, the method comprises the steps of providing an image file depicting an image, in a computer memory, identifying a dominant region of single reflectance in the image and segregating the image into intrinsic images as a function of the dominant region of single reflectance.

In a second exemplary embodiment of the present invention, a computer system is provided. The computer system comprises a CPU and a memory storing an image file containing an image. According to a feature of the present invention, the CPU is arranged and configured to execute a routine to identify a dominant region of single reflectance in the image and segregate the image into intrinsic images as a function of the dominant region of single reflectance.

In a third exemplary embodiment of the present invention, a computer program product is provided. According to a feature of the present invention, the computer program product is disposed on a computer readable media, and the product includes computer executable process steps operable to control a computer to: provide an image file depicting an image, in a computer memory, identify a dominant region of single reflectance in the image and segregate the image into intrinsic images as a function of the dominant region of single reflectance.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programmed to carry out the steps of the methods of the present invention.

BRIEF DESCRIPTION OF THE DRAWINGS

FIG. 6b shows Type C token regions in the image of FIG. 6a.

DETAILED DESCRIPTION OF THE PREFERRED EMBODIMENTS

Figure 1:
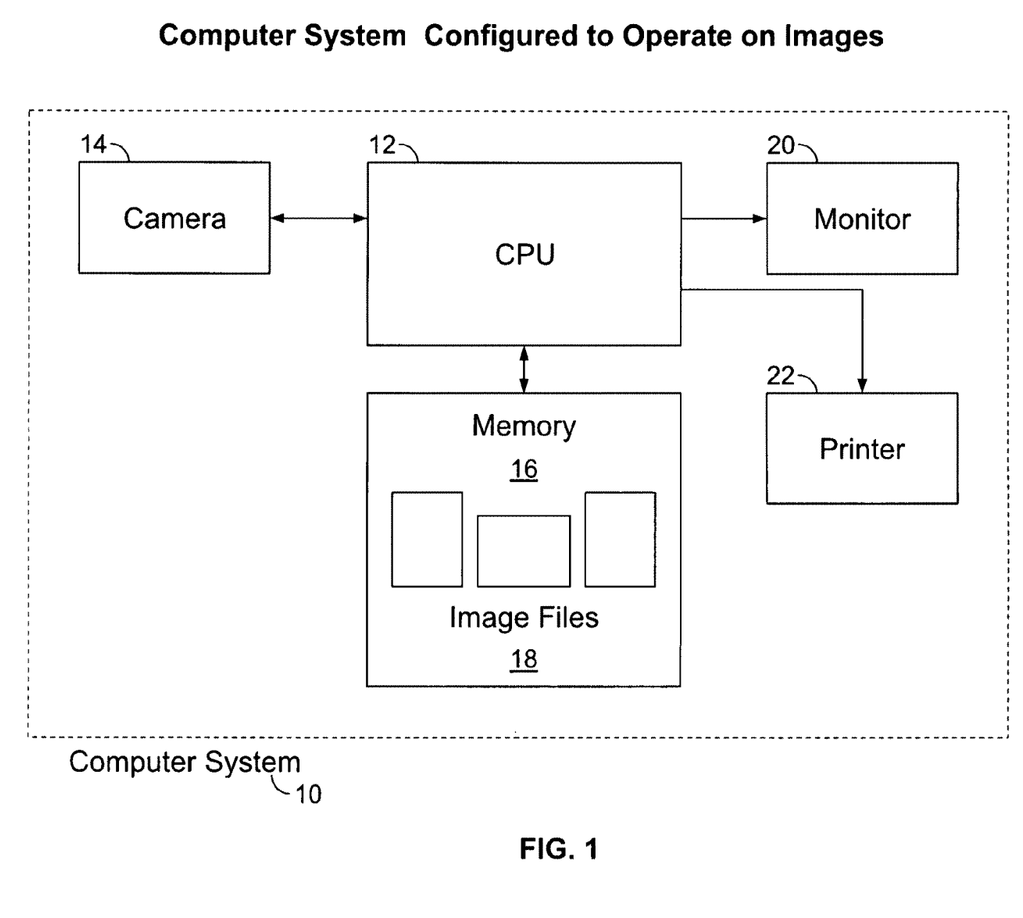
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

Figure 2:
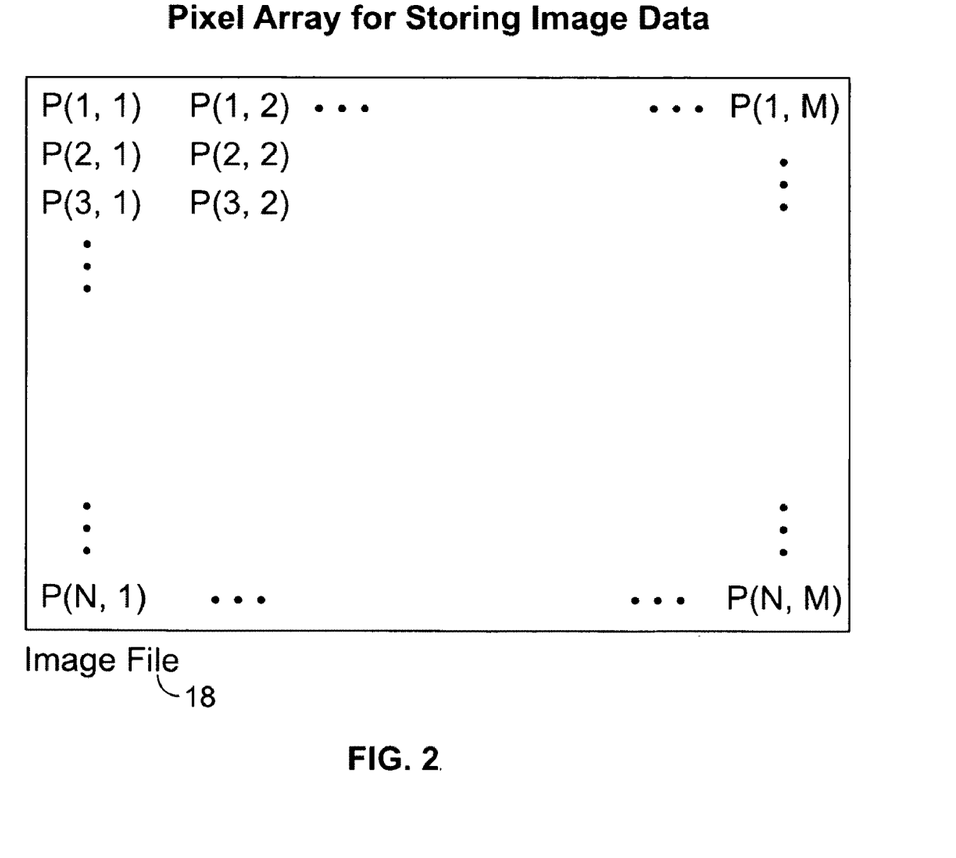
FIG. 2 shows an n×m pixel array image file for an image stored in the computer system of FIG. 1.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to, for example, a set of color bands, for example, red, green and blue color components (RGB) of the picture element, or a single grayscale value. The present invention is applicable to any multi-band image, where each band corresponds to a piece of the electro-magnetic spectrum, or to a single grayscale image depiction. The pixel array includes n rows of m columns each, starting with the pixel p (1,1) and ending with the pixel p(n, m). Thus, each pixel can be uniquely identified by p(r,g,b,x,y) wherein the r,g,b values provide the pixel color, and x,y the position within the n×m pixel array of FIG. 2. When displaying or printing an image, the CPU 12 retrieves the corresponding image file 18 from the memory 16, and operates the monitor 20 or printer 22, as the case may be, as a function of the digital values of the pixels in the image file 18, as is generally known.

According to a feature of the present invention, in an image process, the CPU 12 operates to analyze and process information, for example, the RGB values of the pixels of an image stored in an image file 18, to achieve various objectives, such as, for example, a correct and accurate identification of illumination and material aspects of the image. The present invention provides a method and system for generation of intrinsic images. The intrinsic images correspond to an original image, for example, an image depicted in an input image file 18. The intrinsic images include, for example, an illumination image, to capture the intensity and color of light incident upon each point on the surfaces depicted in the image, and a material reflectance image, to capture reflectance properties of surfaces depicted in the image (the percentage of each wavelength of light a surface reflects).

Figure 3:
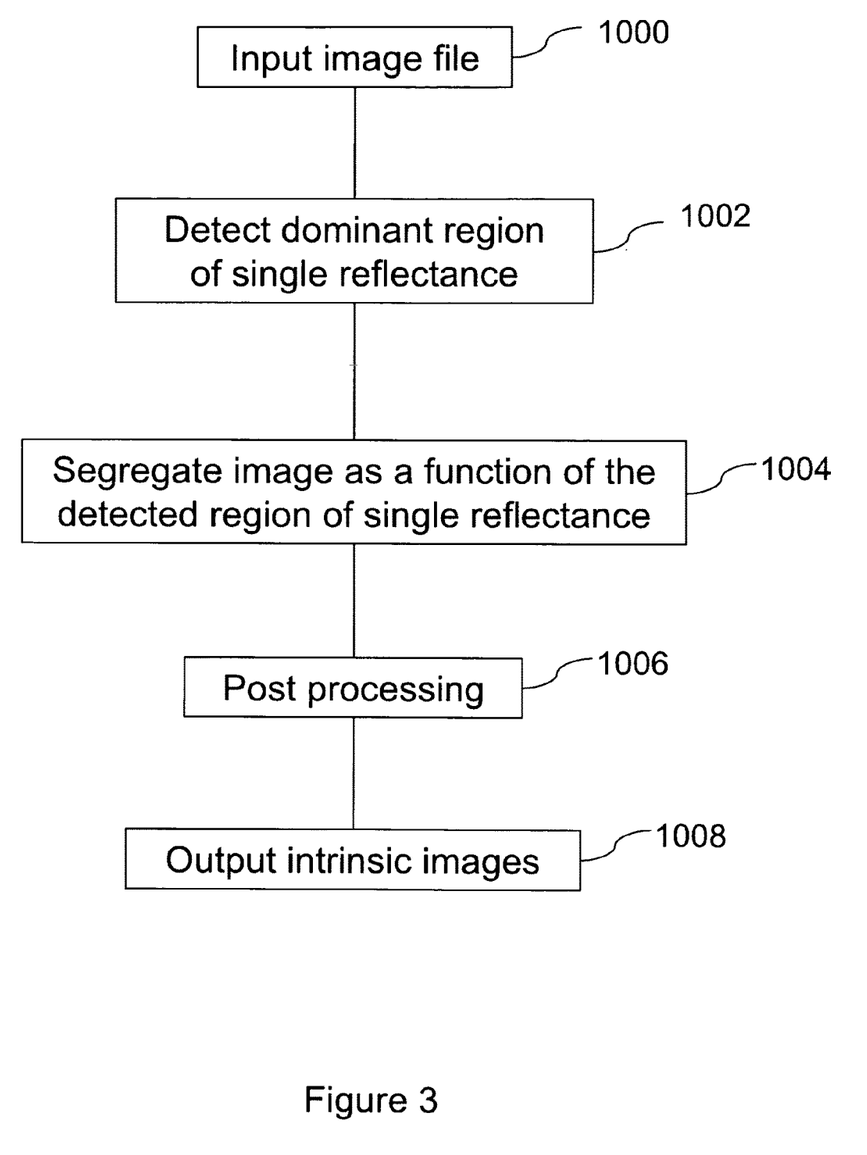
FIG. 3 is a flow chart for performing an operation to generate intrinsic images, using a single reflectance technique, according to a feature of the present invention.

Images depicted in some image files 18 are dominated by a single material, for example, a lawn in a sports playing field, or skin in a human face. In such a case, the present invention utilizes the fact of the dominance of a single reflectance region of an image, to improve computer operations relevant to the generation of intrinsic images. To that end, FIG. 3 shows a flow chart for performing an operation to generate intrinsic images, using a single reflectance technique, according to a feature of the present invention.

In step 1000 a selected image file 18 is input to the CPU 12. In step 1002, the CPU 12 executes a routine to detect a dominant image region of a single reflectance. According to a feature of the present invention, any one of several different methods can be implemented to detect the region of single reflectance. For example, step 1002 can be implemented via alternative methods, such as, for example, a log chromaticity clustering method, a large token analysis, a pixel stability analysis or a spectral analysis, as will appear.

In step 1004, the CPU 12 segregates the image as a function of the detected dominant, single reflectance region of the image depicted in the input image file 18. The segregation can be performed by the CPU 12 through execution of any one of several techniques, for example, a constraint/solver model, or a computation based upon pixels of the detected region of single reflectance. In step 1006, the CPU 12 performs post processing, such as, for example, a factoring of the illumination to provide an image illuminated by diffuse illumination, as will be described in more detail below, then outputs intrinsic images corresponding to the image of the input image file 18 (step 1008).

In the performance of step 1002 using log chromaticity clustering, the CPU 12 computes an illumination-invariant log chromaticity value for each pixel of the input image file 18. Log chromaticity is a technique for developing a two dimensional illumination invariant chromaticity space. A method and system for separating illumination and reflectance using a log chromaticity space is disclosed in U.S. Pat. No. 7,596,266, which is hereby expressly incorporated by reference. The techniques taught in U.S. Pat. No. 7,596,266 can be used to provide illumination invariant log chromaticity representation values for each pixel of an image.

Logarithmic values of the color band values of the image pixels are plotted on a log-color space graph. The logarithmic values are then projected to a log-chromaticity projection plane oriented as a function of a bi-illuminant dichromatic reflection model (BIDR model), to provide a log chromaticity value for each pixel, as taught in U.S. Pat. No. 7,596,266. The BIDR Model predicts that differing color measurement values fall within a cylinder in RGB space, from a dark end (in shadow) to a bright end (lit end), along a positive slope, when the color change is due to an illumination change forming a shadow over a single material of a scene depicted in the image.

Figure 4:
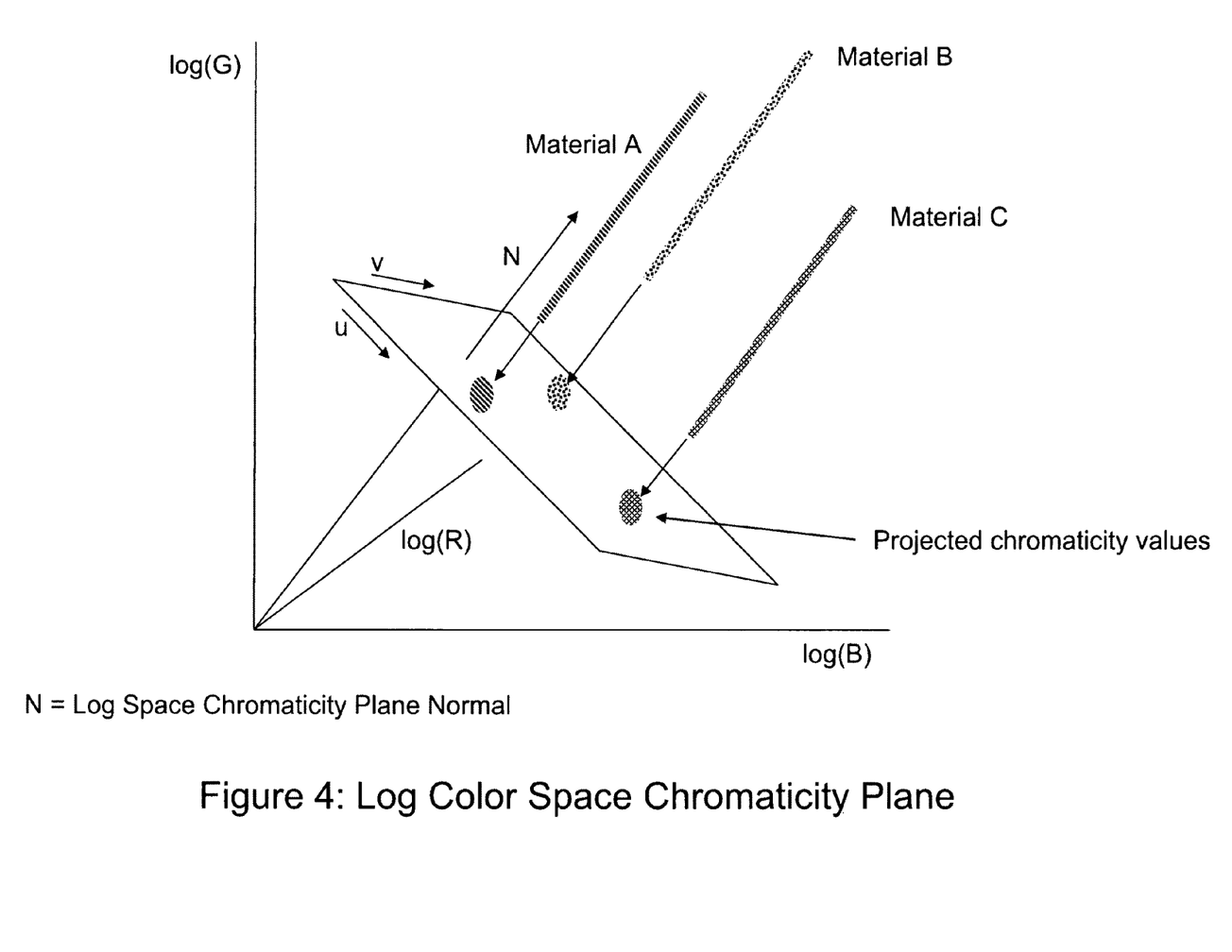
FIG. 4 is a graphic representation of a log color space chromaticity plane according to a feature of the present invention.

FIG. 4 is a graphic representation of a log color space, bi-illuminant chromaticity plane according to a feature of the invention disclosed in U.S. Pat. No. 7,596,266. The alignment of the chromaticity plane is determined by the vector N, normal to the chromaticity plane, and defined as N=log(Bright$_{vector}$)−log(Dark$_{vector}$)=log(1+1/S$_{vector}$). The co-ordinates of the plane, u, v can be defined by a projection of the green axis onto the chromaticity plane as the u axis, and the cross product of u and N being defined as the v axis. In our example, each log value for the materials A, B, C is projected onto the chromaticity plane, and will therefore have a corresponding u, v co-ordinate value in the plane that is a chromaticity value, as shown in FIG. 4.

Thus, the RGB values of each pixel in an image file 18 can be mapped by the CPU 12 from the image file value p(n, m, R, G, B) to a log value, then, through a projection to the chromaticity plane, to the corresponding u, v value, as shown in FIG. 4. Each pixel p(n, m, R, G, B) in the image file 18 is then replaced by the CPU 12 by a two dimensional chromaticity value: p(n, m, u, v), to provide a chromaticity representation of the original RGB image. In general, for an N band image, the N color values are replaced by N−1 chromaticity values. The chromaticity representation is a truly accurate illumination invariant representation because the BIDR model upon which the representation is based, accurately and correctly represents the illumination flux that caused the original image.

Accordingly, all of the pixels of the input image file 18 representing the dominant region of single reflectance, for example, pixels corresponding to skin in an image depicting a human face, will have a similar log chromaticity value (within the noise level of the device used to record the image, for example, the camera 14), and be within a single cluster. The CPU 12 can implement any known clustering algorithm, to cluster pixel log chromaticity values. Pixels representing regions of the image other than the skin, for example, eyebrows, lips, the iris of the eye, and so on, will fall outside the single cluster corresponding to skin pixels. Thus, all pixels within the single large cluster will be designated as being in the dominant region of single reflectance.

Figure 5:
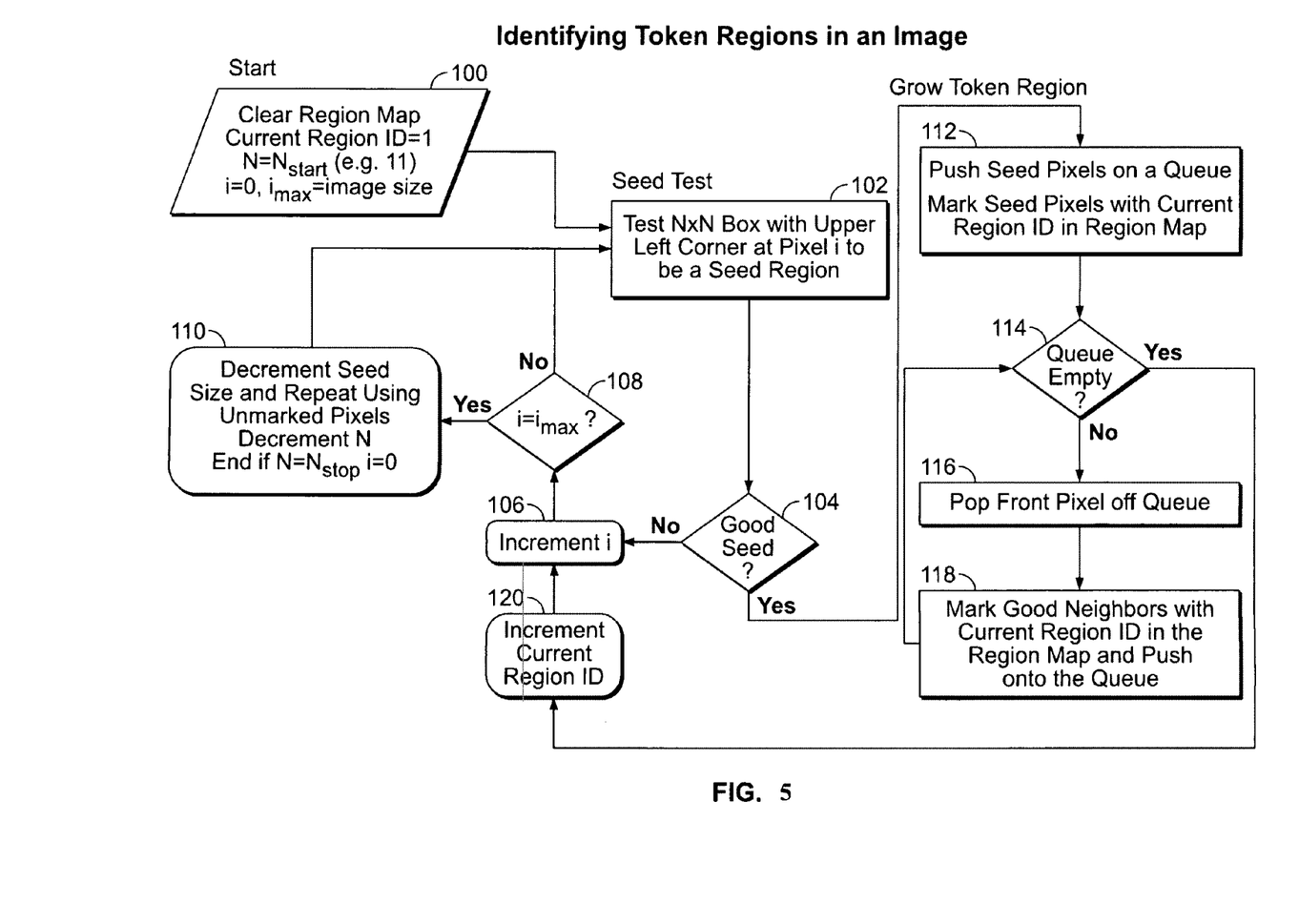
FIG. 5 is a flow chart for identifying Type C token regions in the image file of FIG. 2a, according to a feature of the present invention.

In the performance of step 1002 using the alternative large token analysis, the CPU 12 initially computes Type C tokens. Referring now to FIG. 5, there is shown a flow chart for a tokenization method for generating Type C token regions, according to a feature of the present invention. A 1$^{st}$ order uniform, homogeneous Type C token comprises a single robust color measurement among contiguous pixels of the image. At the start of the identification routine of FIG. 5, the CPU 12 sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, N=N$_{start}$. N$_{start}$ can be any integer >0, for example it can be set at set at 11 or 15 pixels.

At step 102, a seed test is begun. The CPU 12 selects a first pixel, i=(1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel or the filter output intensity histogram representation of the pixel, in the event the image was filtered for texture regions, as described above.

If the comparison does not result in approximately equal values (for example, within the noise levels of the recording device for RGB values) for the pixels in the seed, the CPU 12 increments the value of i (step 106), for example, i=(1, 2), for a next N×N seed sample, and then tests to determine if i=$i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at i=(n, m). In this manner, the routine of FIG. 5 parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token. In the event the pixels comprise intensity histogram representations, the token can be marked as Type $C_T$.

When the queue is empty, the CPU 12 proceeds to step 120. At step 120, the CPU 12 increments the region ID for use with identification of a next token. The CPU 12 then returns to step 106 to repeat the routine in respect of the new current token region.

Figure 6A:
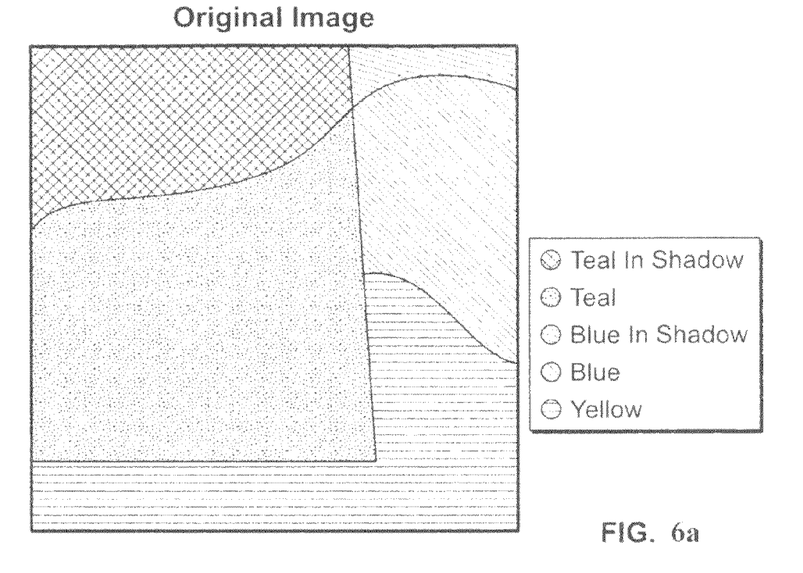
FIG. 6a is an original image used as an example in the identification of Type C tokens.
Figure 6B:
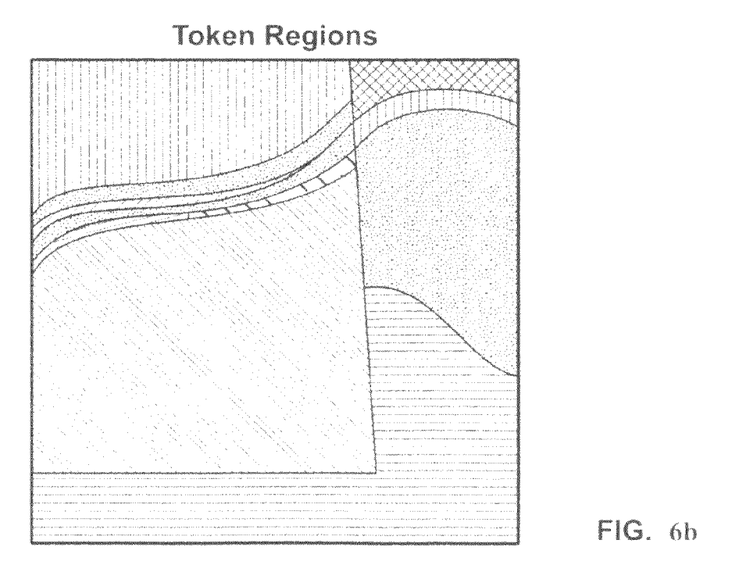

Upon arrival at N=$N_{stop}$, step 110 of the flow chart of FIG. 5, or completion of a region map that coincides with the image, the routine will have completed the token building task. FIG. 6a is an original image used as an example in the identification of tokens. The image shows areas of the color blue and the blue in shadow, and of the color teal and the teal in shadow. FIG. 6b shows token regions corresponding to the region map, for example, as identified through execution of the routine of FIG. 5 (Type C tokens), in respect to the image of FIG. 6a. The token regions are color coded to illustrate the token makeup of the image of FIG. 6a, including penumbra regions between the full color blue and teal areas of the image and the shadow of the colored areas.

In the token size analysis implementation of step 1002, upon the identification of Type C tokens in the selected input image file 18, the CPU 12 performs an analysis of the identified Type C tokens. Type C tokens that include, for example, skin pixels will be large relative to tokens corresponding to pixels representing other features of the face, for example, eyebrows, lips, the iris of the eye, and so on. Thus, a threshold value for a number of pixels in a token can be set so as to be able to identify relatively large tokens, and thereby establish the region of a dominant, single reflectance. For example, the threshold size can be set as a function of the interocular distance (the distance between the eyes), such as: threshold= (interocular distance in pixels)/7.

In the performance of step 1002 using stability analysis, the CPU 12 operates to characterize the stability of pixels in an input image file 18 and defines a dominant region of single reflectance as a function of the pixel stability measurements. For example, the pixels of identified Type C tokens can be analyzed as to stability, the tokens included in the dominant region if the constituent pixels are stable. In a stability analysis, focus is placed upon how similar a subject pixel is to neighboring pixels. Pixels in a dominant region of an image will be similar to a large number of neighboring pixels. Stability can be measured using several different methods.

For example, second derivative energy can be used to indicate the stability of pixels of an image. In this approach, the CPU 12 calculates a second derivative at each pixel, or a subset of pixels disbursed across the image to cover all illumination conditions of the image depicted in an input image file 18, using a Difference of Gaussians, Laplacian of Gaussian, or similar filter. The second derivative energy for each pixel examined can then be calculated by the CPU 12 as the average of the absolute value of the second derivative in each color band (or the absolute value of the single value in a grayscale image), the sum of squares of the values of the second derivatives in each color band (or the square of the single value in a grayscale image), the maximum squared second derivative value across the color bands (or the square of the single value in a grayscale image), or any similar method. The sigma of the gaussian (defining the size of the second derivative filter) is adjusted to interocular distance when the subject image depicts a face.

Upon the calculation of the second derivative energy for each of the pixels, the CPU 12 analyzes the energy values of the pixels. There is an inverse relationship between second derivative energy and pixel stability, the higher the energy, the less stable the corresponding pixel. In an image having a dominant region of single reflectance, all of the pixels in the dominant region will have a similar low second derivative energy. The CPU 12 can identify all such pixels and thereby identify the dominant region of the image.

In a second method for measuring pixel stability, the CPU 12 utilizes a second derivative relative to a vertical direction. This is an approach based upon a recognition of the fact that certain features of the geometry of a face, for example, eyes, eyebrows, nostrils and lips, tend to be horizontally aligned features of a face. Thus, an image can be evaluated in the vertical direction by convolving an image horizontally with a 1-d gaussian filter of some sigma, and then vertically by a 1-d laplacian of gaussian filter. The sigma values used in each convolution process can be set based upon the interocular distance. The result provides second derivative energy information in the vertical direction, which can be used to detect horizontal stripes formed by eyes, eyebrows and lips, while ignoring vertical features such as vertical shadow boundaries. The second derivative energy in the vertical direction can be converted to a single value per pixel, for a stability analysis similar to the second derivative energy method described above.

According to a third method, the CPU 12 applies a bilateral filter to the image. A bilateral filter is an edge preserving blurring filter. The filter changes each pixel value to a weighted average of pixels surrounding a subject pixel. The weights in the weighted average correspond to how similar the surrounding pixels are to the subject pixel both in terms of spectral properties and spatial properties. Thus, a nearby pixel of similar color will have a high weight, while a distant pixel of dissimilar color will have a low weight.

While the weighted average is the typically used output of a known bilateral filter, according to a feature of the present invention, the sum of the weights that go into the weighted average is used to measure pixel stability. The higher the weight, the more similar a pixel is to more of nearby neighbors, and thus, the more stable it is. Each pixel in a dominant region of single reflectance will have a sum of weights for the surrounding pixels which is higher than the pixels representing other areas of the image. The size of the bilateral filter and the threshold for the sum of weights can be adjusted according to the interocular distance. As in the previous methods, this factor is evaluated by the CPU 12 to identify the dominant region in the image.

Stability of pixels can also be evaluated relative to local variance in pixel values. The CPU 12 calculates and evaluates the variance in red, green and blue values in a region surrounding each pixel (or variance in the single value for a grayscale image). The size of the region can be based upon interocular distance in an image depicting a face. The higher the variance, the less stable the pixel. Thus, the evaluation can be based upon the inverse relationship between stability and variance to identify a dominant region.

Each of the above methods for detecting pixel stability produces a value corresponding to the stability of each pixel. The stability values can be used to detect a dominant region by placing a threshold on the values at a preselected value determined empirically: for instance, all pixels which have a sufficiently low variance can be considered stable. The pixel stabilities can be optionally blurred prior to thresholding. Additionally, the resulting region after thresholding can be optionally eroded to remove isolated points and/or dilated to fill in holes.

According to a further exemplary embodiment of the present invention, the performance of step 1002 can be implemented using a spectral analysis. For example, if it is known or expected that the dominant region is a particular color, for example, green for grass in the playing filed of a stadium, then all pixels that are sufficiently similar to the expected color of the dominant region are placed in the region.

Once a dominant region of single reflectance is identified (step 1002), the CPU 12 proceeds to step 1004 to segregate the image into illumination and material aspects of the image. If, for example, the log chromaticity method was implemented to identify the region of single reflectance, the CPU 12 can identify the illumination aspects of the image via the relationship of I=ML, wherein I is the intensity of an image pixel, as recorded and stored in the image file 18, M is the material color and L the illumination value. In the situation of an image with a single dominant region of same reflectance, the CPU 12 can assume any color for all of the pixels within the single large region identified by the CPU 12, for example, a flesh tone, and then solve the I=ML equation for the illumination value of each pixel, using the assumed material color and the recorded value for I, for each pixel of the single dominant region. The result is an illumination map corresponding to the pixels of the dominant region of single reflectance.

Any known in-filling or in-painting technique can be used to expand the illumination filed for the dominant region of single reflectance, to pixels representing other areas of the image, for example, the eyes of an image depicting a human face. For example, a thin plate spline can be fit to the calculated illumination values and used to project the values for the illumination in other areas. For a more detailed description of in-filling or in-painting techniques, reference is made to "Inpainting and the Fundamental Problem of Image Processing" by Jianhong (Jackie) Shen, SIAM News, Volume 36, Number 5, June 2003.

Alternatively, a constraint/solver model can be implemented to segregate the image (step 1004), for example, when, for example, a tokenization was performed to identify the dominant region of single reflectance. All of the Type C tokens identified as being in the region of single reflectance are constrained in a matrix equation, to be of a same material. All adjacent Type C tokens of the image of the image file 18 are also constrained in a matrix equation to be in a smooth-illumination constraint. A smooth-illumination constraint can be used to determine the illumination in regions of the image including regions of the image that are outside the dominant region. In a smooth-illumination constraint, the constraint is based upon the average illumination of the pixels near a shared boundary between adjacent Type C tokens. This constrains the illumination field to be somewhat smooth, as opposed to piecewise constant throughout a token.

Figure 7:
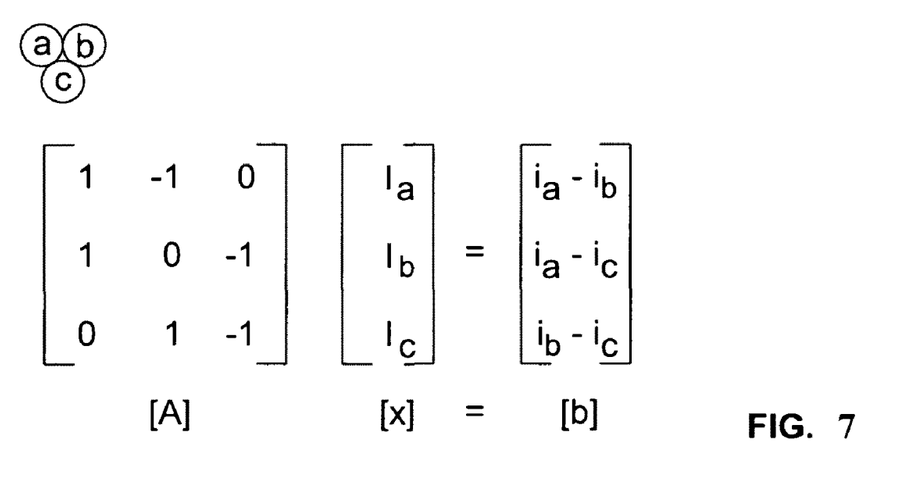
FIG. 7 is a representation of an [A][x]=[b] matrix relationship used to identify and separate illumination and material aspects of an image, according to a same-material constraint feature of the present invention.

FIG. 7 is a representation of an [A][x]=[b] matrix relationship used to identify and separate illumination and material aspects of an image, according to a same-material constraint feature of the present invention. Based upon the previously discussed I=ML equation, log(I)=log(ML)=log(M)+log(L). This can be restated as i=m+l, wherein i represents log(I), m represents log(M) and l represents log(L). In the constraining relationship of a same material, in an example where three Type C tokens, a, b and c, (as shown in FIG. 7) are within the region of single reflectance, as determined by the token size analysis, $m_a=m_b=m_c$. For the purpose of this example, the I value for each Type C token is the average color value for the recorded color values of the constituent pixels of the token.

Since: $m_a=i_a-l_a$, $m_b=i_b-l_b$, and $m_c=i_c-l_c$, mathematical relationships can be expressed, in a same material constraint, as $(1)l_a+(-1)l_b+(0)l_c=(i_a-i_b)$, $(1)l_a+(0)l_b+(-1)l_c=(i_a-i_c)$ and $(0)l_a+(1)l_b+(-1)l_c=(i_b-i_c)$.

Thus, in the matrix equation of FIG. 7, the various values for the log(I) ($i_a$, $i_b$, $i_c$), in the [b] matrix, are known from the average recorded pixel color values for the constituent pixels of the adjacent Type C tokens a, b and c. The [A] matrix of 0's, 1's and −1's, is defined by the set of equations expressing the same material constraint, as described above. The number of rows in the [A] matrix, from top to bottom, corresponds to the number of actual constraints imposed on the tokens, in this case three, the same material constraint between the three adjacent Type C tokens a, b and c. The number of columns in the [A] matrix, from left to right, corresponds to the number of unknowns to be solved for, again, in this case, the three illumination values for the three tokens. Therefore, the values for the illumination components of each Type C token a, b and c, in the [x] matrix, can be solved for in the matrix equation. It should be noted that each value is either a vector of three values corresponding to the color bands (such as red, green, and blue) of our example or can be a single value, such as in a grayscale image.

Figure 8:
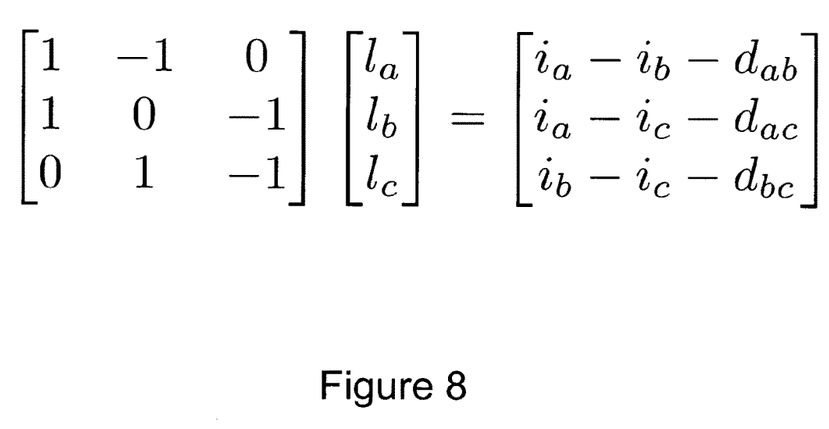
FIG. 8 is a representation of an [A][x]=[b] matrix relationship used to identify and separate illumination and material aspects of an image, according to a smooth-illumination constraint feature of the present invention.

FIG. 8 is a representation of an [A][x]=[b] matrix relationship used to identify and separate illumination and material aspects of an image, according to a smooth-illumination constraint feature of the present invention. In the [b] matrix of FIG. 8, the $d_{ab}$, $d_{ac}$, and $d_{bc}$ terms are each an expression of the log difference between values for pixels along a boundary between adjacent tokens. The CPU 12 examines pairs of pixels along a boundary, for example, for the term $d_{ab}$, the CPU 12 examines pixel pairs, one pixel per token, along the boundary between token a and token b. The CPU 12 records the difference in log image values for each pair, and then aggregates the recorded values for a single difference of log values for the token pair. The aggregation procedure can be implemented as a mean, median, mean shift or any other standard distribution characterization.

In a standard least squares solver, the matrix equations of FIGS. 7 and 8 are concatenated, and the resulting matrix array (with the matrix of FIG. 7 representing all Type C tokens of the dominant region and the matrix of FIG. 8 representing all adjacent Type C tokens of the image file 18), is restated as min over x of $(Ax-b)^2$. The CPU 12 then executes the least squares operation to simultaneously determine optimized values for each of $1_a$, $1_b$ and $1_c$. The CPU 12 can then proceed to generate and display an illumination image based upon the optimal $1_a$, $1_b$ and $1_c$ values. The CPU 12 operates to find a solution that maximally makes all of the Type C tokens (or pixels) in the dominant region the same color while simultaneously making the illumination field as smooth as possible across all adjacent Type C tokens in the image. In general, the CPU 12 is operated to weigh the constraints such that violating the same-material constraints is very expensive relative to violating the smooth illumination constraints. This makes sure that the solution to the over-constrained system of equations results in the tokens (or pixels) in the same-material dominant region being almost perfectly a uniform color.

To obtain the illumination image, the $1_a$, $1_b$ and $1_c$ optimized values are substituted for the originally recorded RGB values, for each pixel of the respective tokens. As noted above, the matrix equation is arranged to express a same-material constraint between all of the Type C tokens identified as being in the dominant region of single reflectance, and a smooth-illumination constraint between all adjacent pairs of Type C tokens in the image of the image file 18. The CPU 12 can proceed to also generate a material image by calculating the $m_a$, $m_b$, $m_c$ values from the known recorded image values $i_a$, $i_b$, $i_c$, and the determined $1_a$, $1_b$ and $1_c$ values, utilizing the model expressed by $i=m+1$.

Returning once again to FIG. 3, in step 1006, the CPU 12 performs post processing, such as, for example, a factoring of the illumination to provide an image illuminated by diffuse illumination, to optimize the appearance of, for example, a face depicted in the original image, for improved performance of a face recognition task, or for the performance of any processing wherein curvature information is important. Known face recognition algorithms utilize curvature information indicated by shading in the image. The curvature information is most accurately depicted when there is diffuse illumination across the image such that illumination variation is caused by changes in the geometry of the face, and not by strong cast shadows from the brow, nose, or from external sources such as hats.

In the performance of the operations to segregate the image into illumination and material aspects of the image, the resulting material image does not contain any curvature information, and the resulting illumination image contains both curvature information and potentially undesirable illumination effects such as cast shadows and strong trends that can make one side of an image brighter than the other side, for example, when a face is lit from one side.

According to a feature of the present invention, a post processing operation can be performed to factor the illumination image so as to separate the diffuse shading aspects of the illumination image from the cast shadow and strong trend aspects of the illumination image. To that end, the CPU 12 is operated to perform an edge preserving blurring filter operation. For example, a bilateral filter can be applied to the illumination image to naturally preserve the sharp transitions due to cast shadows and strong trends. If the filter is applied several times in succession, for example, three or four times, the slowly-varying curvature will be removed from the illumination image, while the transitions due to cast shadows and strong trends will be retained in the modified illumination image.

In an exemplary embodiment of the present invention, the CPU 12 applies a bilateral filter to a log illumination image, one or more times in succession. The resulting blurred log illumination image, showing only cast shadows and strong trends, is then subtracted from the original log illumination image to provide a log diffuse shading illumination image. The log diffuse shading illumination image is then added to a log material image to generate a version of the original image as it would appear if originally illuminated by diffuse illumination. The subtraction and addition in log space is equivalent to dividing and multiply images in the original color space, such as RGB space.

In the event that only a diffuse-looking result image is needed for further processing (and not the diffuse illumination field separately), such as a face recognition operation, an edge preserving blurring technique can be applied to the illumination image, as described above, and then the original image is divided by this processed illumination image (or subtracted in log space) to obtain an image that appears like it was taken in diffuse conditions. This is mathematically equivalent to multiplying the diffuse shading by the reflectance image.

As an alternative to the bilateral filter, the CPU 12 can apply a mean shift procedure, an anisotropic diffusion, or any other similar method that preserves potentially undesirable illumination effects, to provide a resulting image showing the cast shadow and strong trend aspects of the illumination image. The resulting image can then be manipulated with the original illumination image to generate a diffuse illumination image showing curvature information.

Similarly, a known retinex method can be implemented. A retinex operation removes small gradients, while retaining large gradients. Cast shadows cause large gradients, while curvature shading causes small gradients. Thus, a retinex method can be used as an edge preserving technique to separate the diffuse shading aspects of the illumination image from the cast shadow and strong trend aspects of the illumination image.

In a further exemplary embodiment of the present invention, a diffuse illumination image can be obtained by using an edge masking and reintegration technique. A known edge detection method, such as, for example, a Canny edge detection, is implemented by the CPU 12 to detect edges in an illumination image. The CPU 12 then calculates a gradient field for the illumination image, and sets the gradients for pixels along each detected edge to zero. The gradient field, as modified to zero out edge pixel gradients, is then reintegrated into the original illumination image to provide a diffuse illumination image. The reintegration can be performed utilizing any well known image reintegration technique, for reintegrating a gradient field into an image, such as, for example, a Poisson solver.

In step 1008, the CPU 12 outputs the illumination image and/or the material image for further processing, as for example, for input to a face recognition process.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
   providing an image file depicting an image, in a computer memory;
   identifying a dominant region of single reflectance in the image wherein the step of identifying a dominant region of single reflectance in the image is carried out by performing a pixel stability analysis, and segregating the image into intrinsic images as a function of the dominant region of single reflectance.

2. The method of claim 1 wherein the pixel stability analysis is carried out by implementing a technique selected from a group including a second derivative energy analysis, a directional second derivative energy analysis, an analysis based upon application of an edge preserving blurring filter, and a local variance analysis.

3. An automated, computerized method for processing an image, comprising the steps of:
   providing an image file depicting an image, in a computer memory;
   identifying a dominant region of single reflectance in the image, and segregating the image into intrinsic images as a function of the dominant region of single reflectance wherein the step of segregating the image into intrinsic images as a function of the dominant region of single reflectance is carried out by performing a constraint/solver model, and wherein the constraint/solver model is based upon a tokenization of the image file.

4. A computer program product, disposed on a non-transitory computer readable media, the product including computer executable process steps operable to control a computer to: provide an image file depicting an image, in a computer memory, identify a dominant region of single reflectance in the image and segregate the image into intrinsic images as a function of the dominant region of single reflectance wherein the process step to segregate the image into intrinsic images as a function of the dominant region of single reflectance is carried out by performing a constraint/solver model and wherein the constraint/solver model is based upon a tokenization of the image file.

5. A computer program product, disposed on a non-transitory computer readable media, the product including computer executable process steps operable to control a computer to: provide an image file depicting an image, in a computer memory, identify a dominant region of single reflectance in the image wherein the process step to identify a dominant region of single reflectance in the image is carried out by performing a pixel stability analysis and segregate the image into intrinsic images as a function of the dominant region of single reflectance.

6. The computer program product of claim 5 wherein the pixel stability analysis is carried out by implementing a technique selected from a group including a second derivative energy analysis, a directional second derivative energy analysis, an analysis based upon application of an edge preserving blurring filter, and a local variance analysis.

* * * * *